(12) United States Patent
Raihala

(10) Patent No.: US 10,322,413 B2
(45) Date of Patent: Jun. 18, 2019

(54) ACTUATOR PIN INCORPORATING A LATERAL STABILIZER

(71) Applicant: Genesis Attachments, LLC, Superior, WI (US)

(72) Inventor: Daniel J. Raihala, Superior, WI (US)

(73) Assignee: Genesis Attachments, LLC, Superior, WI (US)

( * ) Notice: Subject to any disclaimer, the term of this patent is extended or adjusted under 35 U.S.C. 154(b) by 0 days.

(21) Appl. No.: 14/768,689

(22) PCT Filed: Feb. 18, 2014

(86) PCT No.: PCT/US2014/017002
§ 371 (c)(1),
(2) Date: Aug. 18, 2015

(87) PCT Pub. No.: WO2014/127382
PCT Pub. Date: Aug. 21, 2014

(65) Prior Publication Data
US 2016/0001293 A1 Jan. 7, 2016

Related U.S. Application Data

(60) Provisional application No. 61/766,079, filed on Feb. 18, 2013.

(51) Int. Cl.
*B23D 31/00* (2006.01)
*B02C 1/02* (2006.01)
(Continued)

(52) U.S. Cl.
CPC ............... *B02C 1/02* (2013.01); *B23D 17/00* (2013.01); *B23D 31/008* (2013.01); *E02F 3/965* (2013.01);
(Continued)

(58) Field of Classification Search
CPC ........ E02F 3/965; B23D 17/00; B23D 31/008
See application file for complete search history.

(56) References Cited

U.S. PATENT DOCUMENTS 4,776,093 A * 10/1988 Gross ..................... B23D 17/00
30/134
5,060,378 A * 10/1991 LaBounty ............. E01C 23/122
30/134
(Continued)

FOREIGN PATENT DOCUMENTS

GB          1392022          4/1975

OTHER PUBLICATIONS

European Search Report, dated Nov. 11, 2016, pp. 1-5.

*Primary Examiner* — Kenneth E Peterson
(74) *Attorney, Agent, or Firm* — Thomas J. Oppold; Larkin Hoffman Daly & Lindgren, Ltd.

(57) ABSTRACT

An actuator pin incorporating a lateral stabilizer for an upper jaw of a demolition shear. The actuator pin includes a head. The head has an outer periphery configured to be receivable within a complimentary configured keeper attached to one side of the clevis end of the actuator such that the head is rotationally fixed with respect to the keeper. A pin cap is secure to a distal end of the pin. The pin cap has an outer periphery configured to be receivable within a complimentary configured keeper attached to another side of the clevis end of the actuator such that the pin cap is rotationally fixed with respect to the keeper.

5 Claims, 7 Drawing Sheets

(51) Int. Cl.
*E04G 23/08* (2006.01)
*B23D 17/00* (2006.01)
*E02F 3/96* (2006.01)
*E02F 9/00* (2006.01)
*F16C 11/04* (2006.01)
*F16C 11/02* (2006.01)

(52) U.S. Cl.
CPC ............ *E02F 9/006* (2013.01); *E04G 23/082* (2013.01); *F16C 11/02* (2013.01); *F16C 11/04* (2013.01); *F16C 11/045* (2013.01); *F16C 2350/26* (2013.01)

(56) References Cited

U.S. PATENT DOCUMENTS

| | | | | |
|---|---|---|---|---|
| 5,715,603 | A * | 2/1998 | Dorguin | B23D 17/00 241/101.73 |
| 5,992,023 | A * | 11/1999 | Sederberg | E04G 23/08 241/101.73 |
| 6,061,911 | A * | 5/2000 | LaBounty | B23D 17/00 241/101.73 |
| 7,216,575 | B2 * | 5/2007 | Alseth | B23D 31/008 30/134 |
| 2006/0005395 | A1 * | 1/2006 | Sederberg | B23D 17/00 30/123.3 |
| 2012/0091242 | A1 * | 4/2012 | Ramun | A62B 3/005 241/264 |
| 2016/0001293 | A1 * | 1/2016 | Raihala | E04G 23/082 241/267 |

* cited by examiner

US 10,322,413 B2

1

ACTUATOR PIN INCORPORATING A LATERAL STABILIZER

BACKGROUND

Demolition shear attachments which mount to the end of a boom or stick of an excavator and which are used for cutting or shearing steel I-beams, channels, pipes, metal plate and other materials are well known. Such shear attachments typically have a main body supporting a fixed lower jaw and a movable upper jaw which pivots about a pivot pin. The upper jaw is moved between an open position and a closed position by extending and retracting a hydraulic cylinder or actuator protected within the main body. Hardened steel blades are attached to one side of the upper and lower jaws (i.e., the "blade-side"). In use, the shear attachment is positioned such that the workpiece to be cut or sheared is positioned between the open jaws. As the jaws close over the workpiece, the adjacent edges of the hardened steel blades on the upper and lower jaws pass in close proximity to each other shearing the workpiece along a shear plane, much like a scissors.

It is recognized that when the upper jaw begins to shear through a workpiece, tremendous lateral forces are exerted on the upper jaw in the direction away from the blade-side of the lower jaw (i.e., toward the "guide-side" of the lower jaw). These lateral forces produce a moment in the direction of the lateral forces about the pivot pin. If the upper jaw is not restrained to resist these lateral forces by providing an opposing reactionary force and counteracting moment, the forward end of the upper jaw will tend to translate laterally away from the blade-side of the lower jaw. Thus, without a reactionary force and counteracting moment to prevent the upper jaw from translating laterally, sever stress can be exerted on the pivot pin potentially bending, shearing or otherwise damaging the pivot pin and the upper jaw.

To restrain the upper jaw from translating laterally by providing a reactionary force and counteracting moment, and to thereby minimize stress on the pivot pin and the upper jaw, lateral stabilizers are employed such as disclosed in U.S. Pat. Nos. 6,061,911 and 7,216,575. These lateral stabilizers have heretofore been positioned in the main body of the shear attachment so as to bear against the blade-side of the upper jaw rearward of the pivot pin and to bear against the guide-side of the upper jaw forward of the pivot pin so as to provide the necessary reaction forces and counteracting moments to prevent the upper jaw from translating laterally during the shearing operation.

While positioning lateral stabilizers in the main body of the shear attachment may serve the intended purpose, positioning a lateral stabilizer on the main body rearward of the pivot pin may not be feasible in certain configurations of the shear attachment. For example, in shear attachments which utilize dual actuators to open and close the upper jaw, there may be insufficient space in which to mount the lateral stabilizer in the main body rearward of the jaw pivot pin without interfering with the second actuator. Accordingly, there is a need for an alternative means of laterally stabilizing the upper jaw of a demolition shear attachment where the lateral stabilizer is not mounted within the main body of the shear attachment.

2

Figure 1:
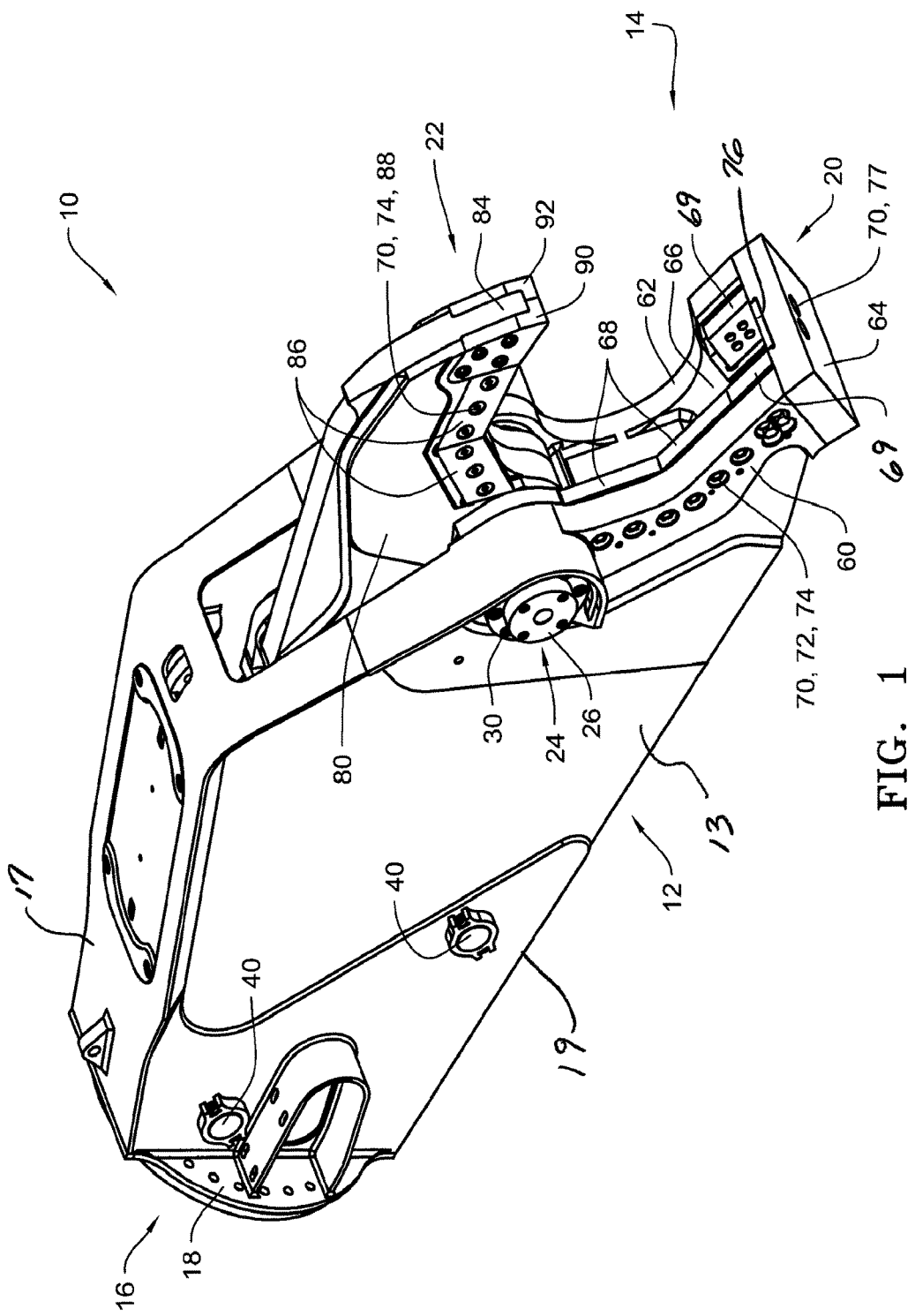
FIG. 1 is a left side perspective view of one embodiment of a demolition shear attachment having dual actuators which utilizes a blade stabilizer incorporated into one of the actuator pins.
Figure 2:
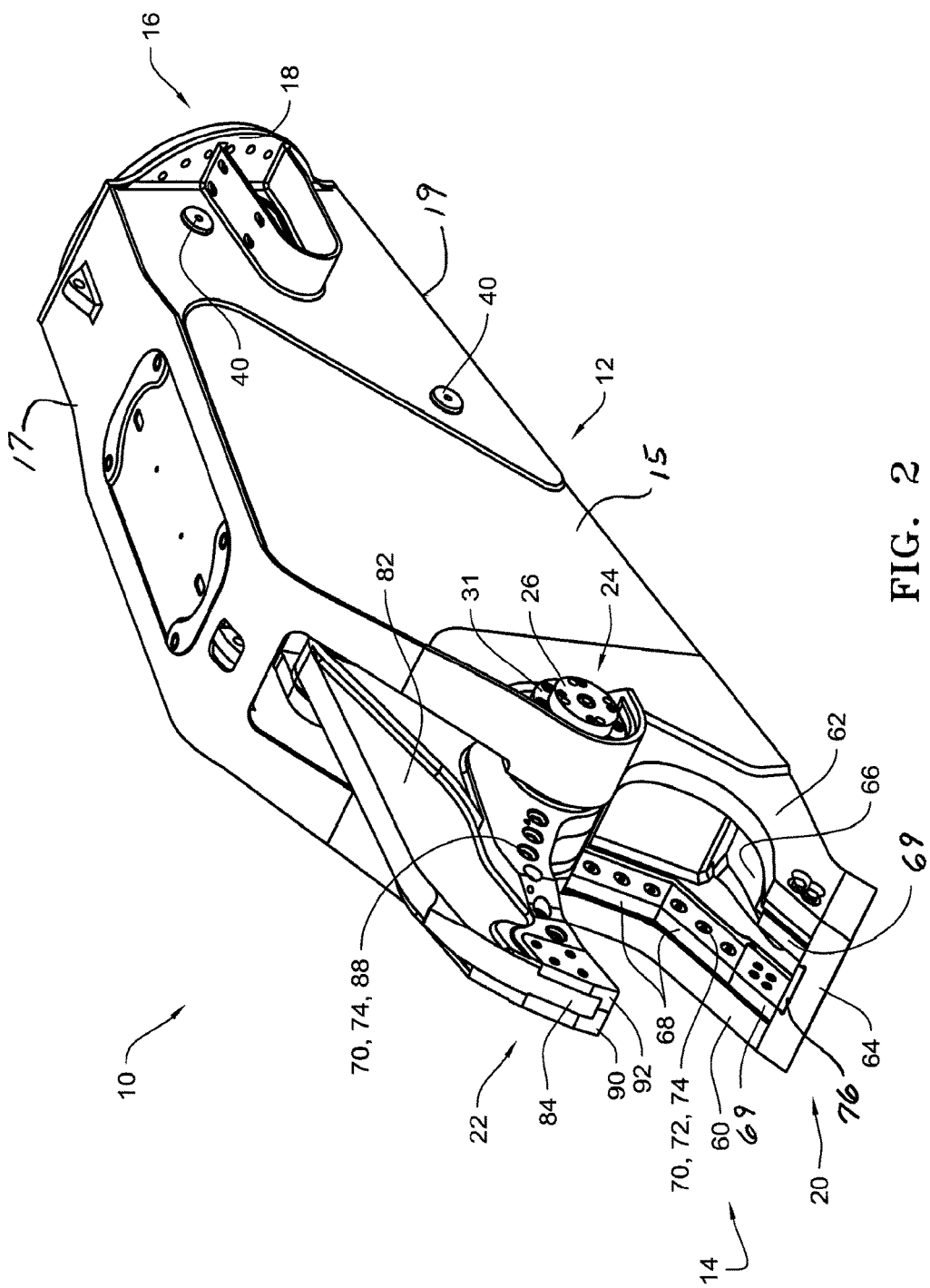

FIG. 2 is a right side perspective view of the demolition shear attachment of FIG. 1.

Figure 3:
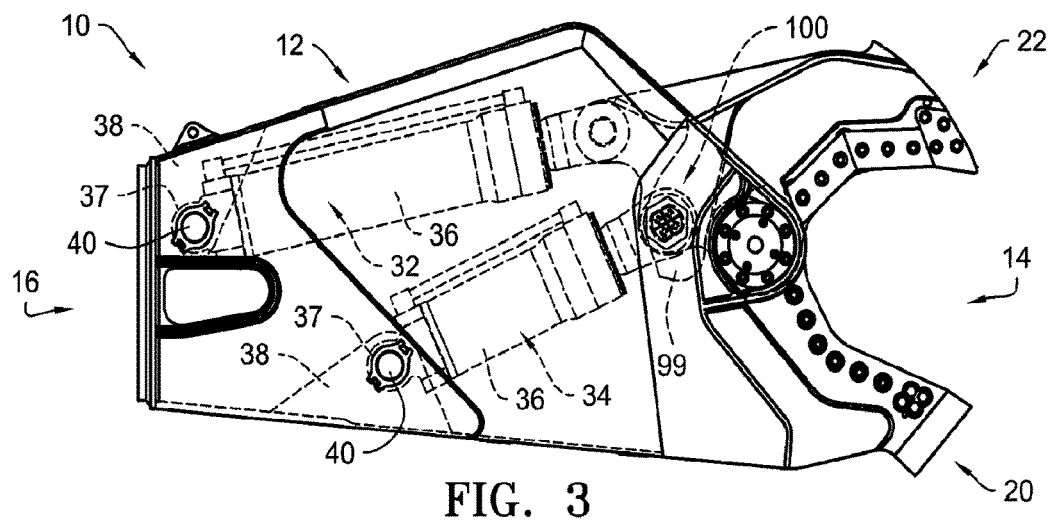
Figure 4:
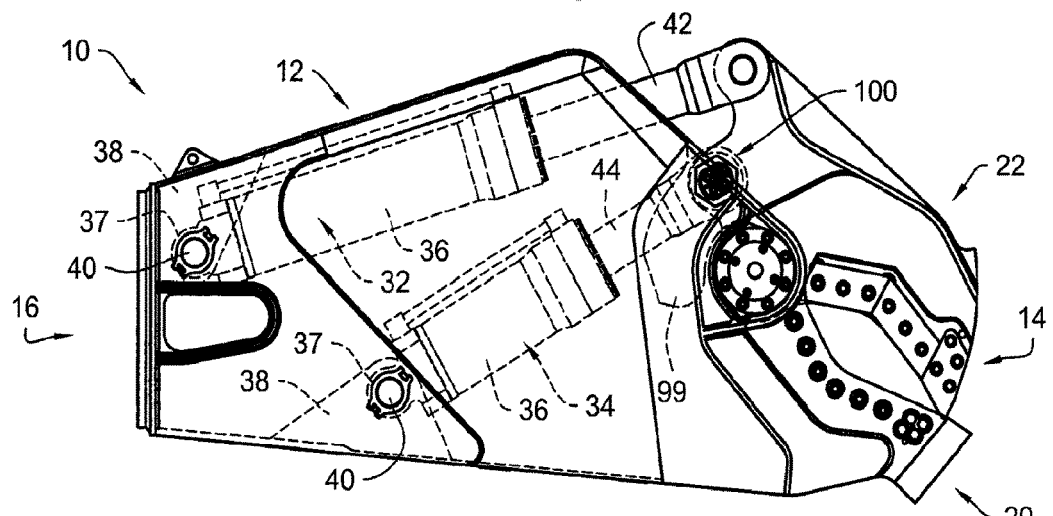
Figure 5:
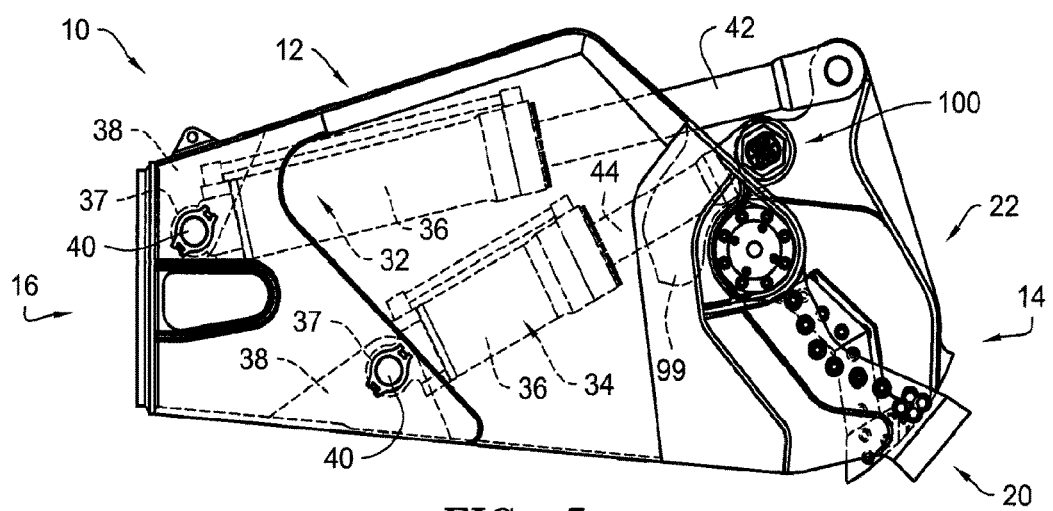

FIGS. 3-5 are a series of left side elevation views of the demolition shear attachment of FIG. 1 illustrating the range of motion of the upper jaw provided by the dual actuators.

Figure 6:
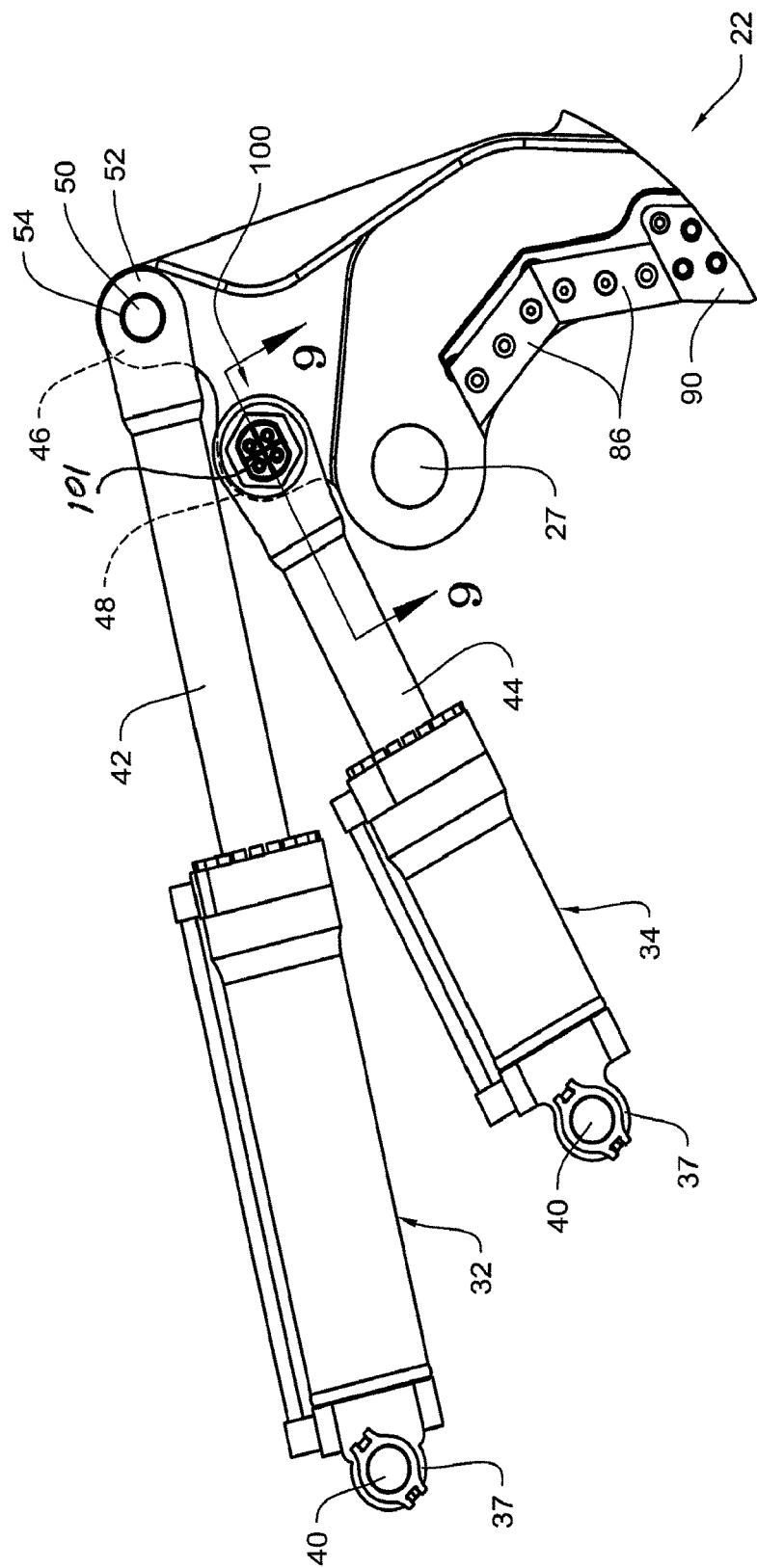

FIG. 6 shows an embodiment of the upper jaw of the demolition shear corresponding to the position shown in FIG. 5 with the dual actuators with the main body of the shear removed for clarity.

Figure 7:
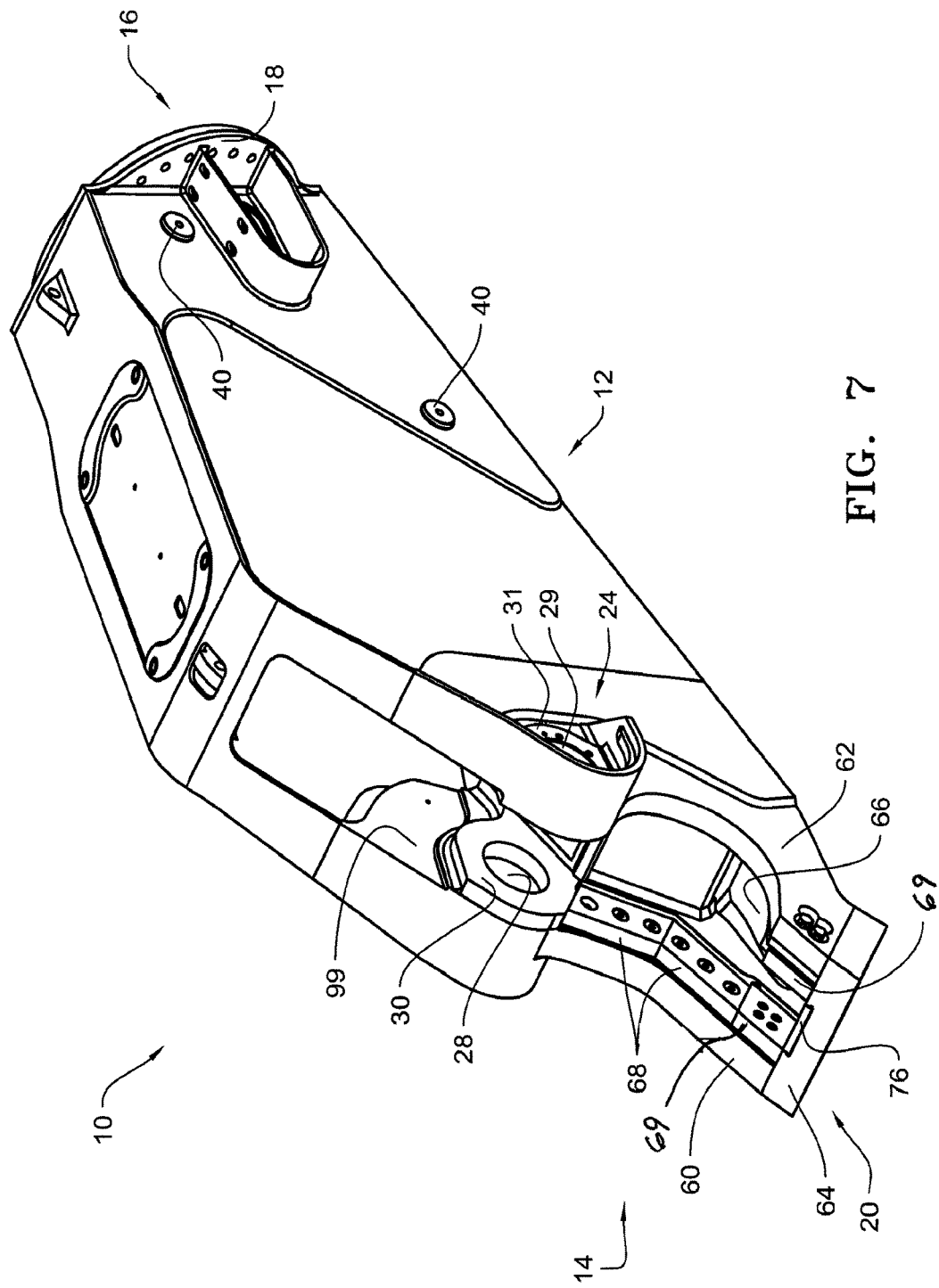

FIG. 7 is the same right side perspective view of the shear attachment of FIG. 2 but with the upper jaw removed.

Figure 8:
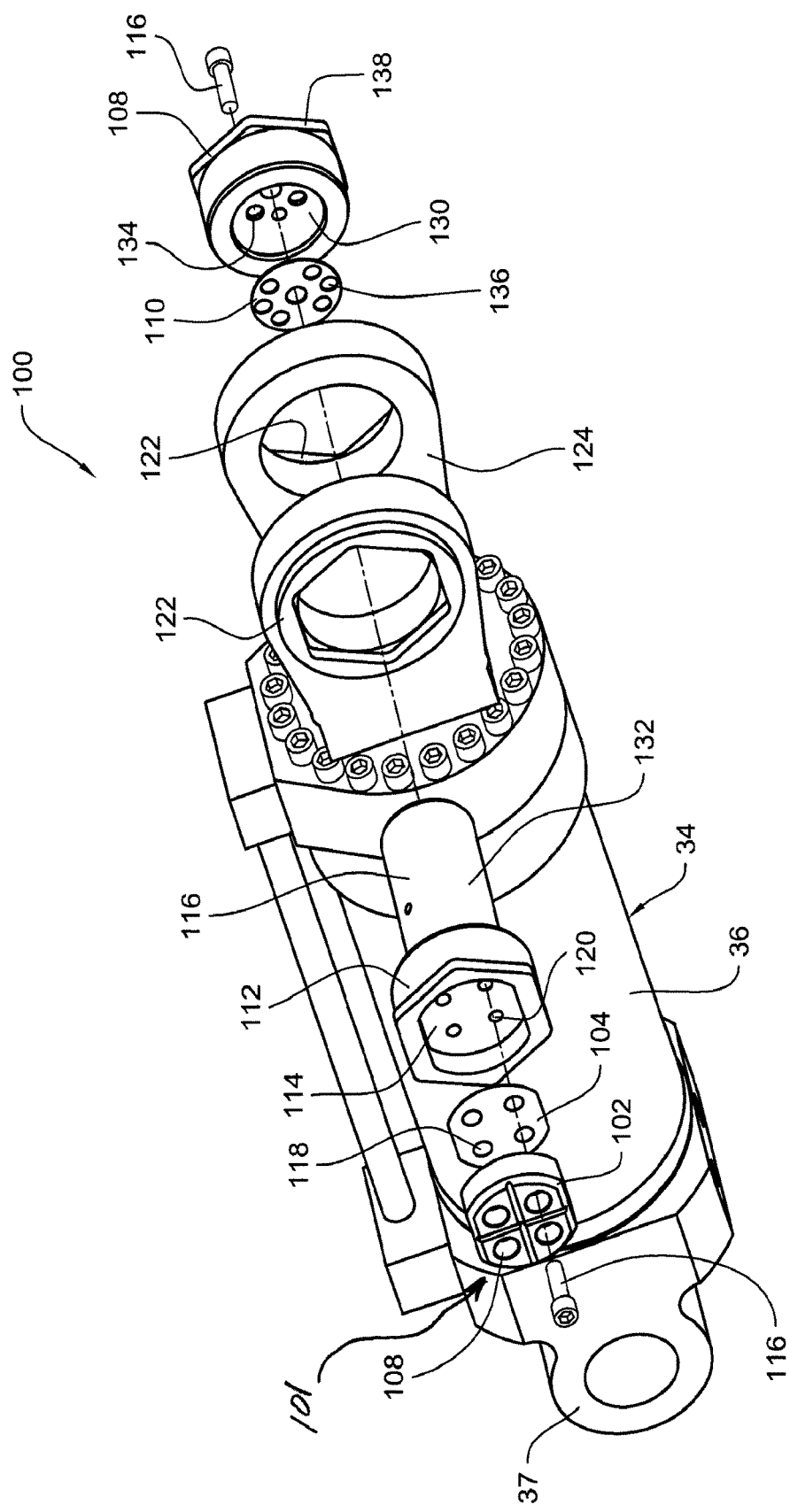

FIG. 8 is an exploded perspective view of one embodiment of an actuator pin assembly incorporating a blade stabilizer or puck.

Figure 9:
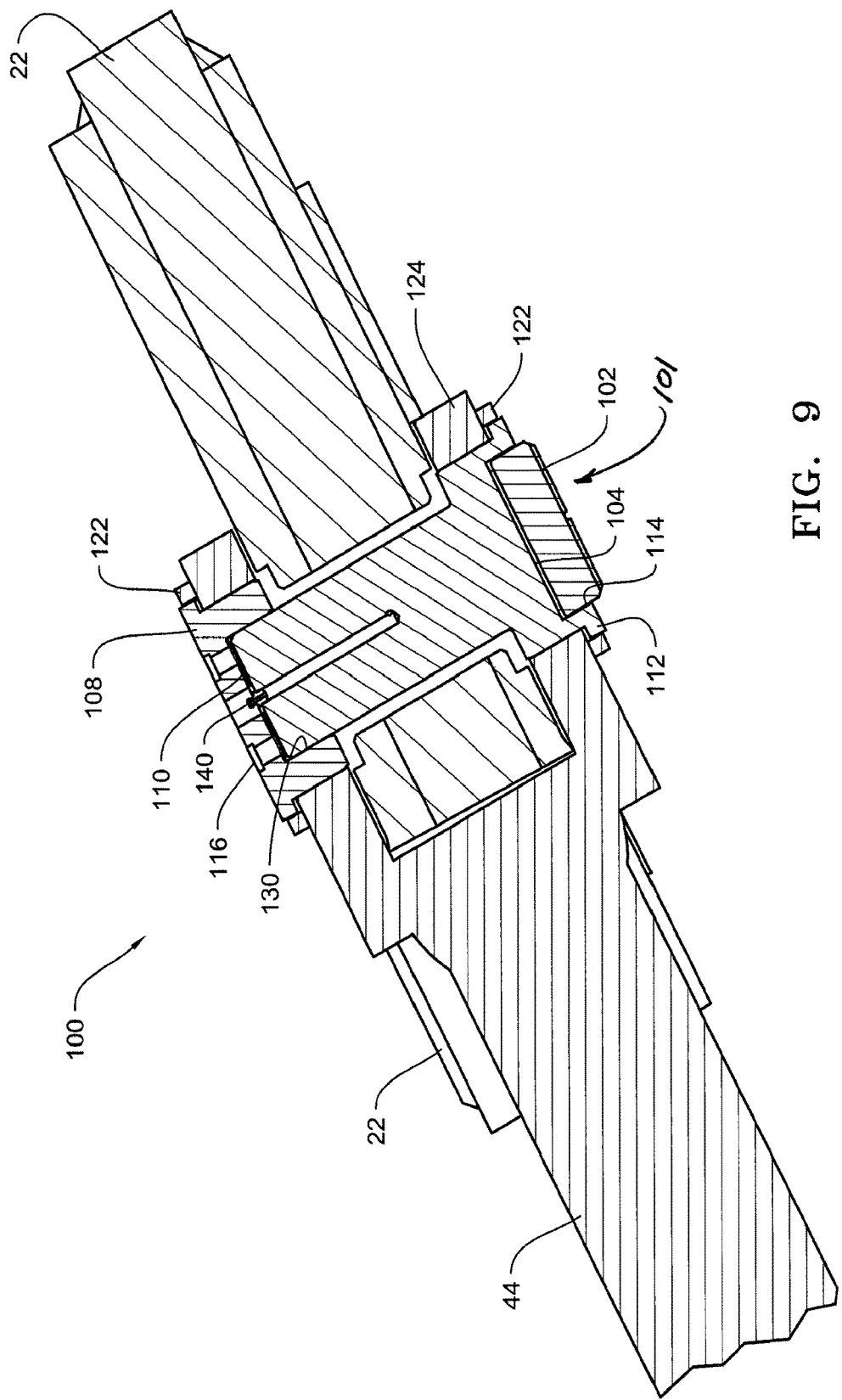

FIG. 9 is a partial cross-sectional view of the actuator pin assembly as viewed along line 9-9 of FIG. 6.

DESCRIPTION

Referring to the drawings wherein like reference numerals designate the same or corresponding parts throughout the several views, FIG. 1 is left side perspective view of one embodiment of a demolition shear attachment 10 having a main body 12 with a forward end 14 and a rearward end 16. The rearward end 16 is adapted to be operably mounted to the boom or stick of an excavator (not shown). In the embodiment shown, a circular mounting plate 18 is secured to the main body 12 for receiving an intermediate swivel attachment (not shown). However, it should be appreciated, that the rearward end 16 of the shear attachment 10 may be adapted for mounting to the boom or stick of an excavator in any other conventional manner, with or without an intermediate swivel attachment, as would be recognized and understood by those of skill in the art.

Referring to FIGS. 1-5, the forward end 14 of the main body 12 includes a fixed lower jaw 20 and a movable upper jaw 22. The movable upper jaw 22 is pivotally supported at the forward end 14 by a pivot assembly 24 comprising a jaw pivot pin 26 that extends through an aperture 27 (FIG. 6) of the upper jaw 22 and through apertures 28, 29 (FIG. 7) within left and right jaw pivot hubs 30, 31 on opposing sides of the main body 12 of the shear attachment 10.

The main body 12 of the shear attachment is typically constructed of steel side plates 13, 15, a top plate 17 and a bottom plate 19 which together define a substantially enclosed area within which hydraulic actuators 32, 34 (FIGS. 3-5) and other hydraulic components of the shear attachment 10 are substantially enclosed and protected. As best illustrated in FIGS. 3-5, by extending and retracting the rams or piston rods 42, 44 of the hydraulic actuators 32, 34, the upper jaw 22 is caused to pivot about the jaw pivot pin 26 between an open position (FIG. 3) and a closed position (FIG. 5) with respect to the lower jaw 20.

The cylinder bodies 36 of the hydraulic actuators 32, 34 include a rearward clevis 37 which pivotally attaches to internal gussets 38 by pivot pins 40 extending through the rearward clevis 37, gussets 38 and side plates 13, 15 of the main body 12 of the shear attachment 10. As best viewed in FIG. 6, the piston rods 42, 44 of the actuators 32, 34 are pivotally attached at their forward ends to upper and lower lobes 46, 48, respectively, on the upper jaw 22. The upper piston rod 42 is pivotally attached to the upper lobe 46 of the upper jaw 22 by a conventional actuator pin 50 extending through a forward clevis 52 and through an aperture 54 in the upper lobe 46. The lower piston rod 44 is pivotally attached to the lower lobe 48 of the upper jaw 22 by a lower actuator pin assembly 100 (described later) extending through a forward clevis 124 and through an aperture 58 in the lower lobe 48.

Referring again to FIGS. 1 and 2, the lower jaw 20 includes forwardly extending, laterally spaced and substantially parallel jaw beams 60, 62. A cross-beam 64 extends laterally or transversely between the forward ends of the laterally space jaw beams 60, 62. The laterally spaced jaw beams 60, 62 and the cross-beam 64 together define a slot or open cavity 66 into which the upper jaw 22 is received during the shearing process (see FIGS. 3-5). The forwardly extending jaw beam 60 is adapted to receive lower shear blade inserts 68 and guide blade inserts 69 and is hereinafter referred to as the blade-side jaw beam 60. The other forwardly extending jaw beam 62 serves to provide structural rigidity to the lower jaw 20 and also serves to laterally restrain and guide the upper jaw 22 into the slot 66 during the shearing process and is hereinafter referred to as the guide-side jaw beam 62.

The lower shear blade inserts 68 are seated in and secured to the inner side of the blade-side jaw beam 60 by threaded connectors 70 extending through apertures 72 in the lower shear blade inserts 68 and through aligned apertures in the blade-side jaw beam 60. The threaded connectors 70 are threadably received and secured by recessed nuts 74. A guide blade insert 69 is seated and secured to the inner side of the blade-side jaw beam 60 and an opposing guide blade insert 69 is seated in and secured to the inner side of the guide-side jaw beam 62. The guide blade inserts 69 are secured by threaded connectors 70 extending through apertures 72 in the jaw beams 60, 62. The ends of the threaded connectors 70 are threadably received by tapped internally threaded apertures 75 in the guide blade inserts 69. When mounted, the inner edges and planar vertical wear surfaces of the lower shear blade inserts 68 and the guide blade insert 69 on the lower blade-side jaw beam 60 are substantially coplanar.

A cross blade insert 76 is seated in and secured to the cross-beam 64 by threaded connectors 70 extending through apertures 77 in the cross-beam 64. The ends of the threaded connectors are threadably received by tapped and internally threaded apertures (not shown) in the cross blade insert 76.

The upper jaw 22, likewise, has a blade-side 80 and a guide-side 82 which correspond to the adjacent blade-side jaw beam 60 and guide-side jaw beam 62 of the lower jaw 20. Upper shear blade inserts 86 are seated in and secured to the blade-side 80 of the upper jaw 22 by threaded connectors 70 extending through apertures 88 in the upper shear blade inserts 86 and through aligned apertures in the blade-side 80 of the upper jaw 22. The threaded connectors 70 are threadably received and secured by recessed nuts 74.

Mirror image piercing tip inserts 90, 92 are seated and attached to each side of the nose portion 84 of the upper jaw 22 by threaded connectors 94 (such as socket headed cap screws). The heads of the connectors 94 are recessed below the vertical planar wear surface of the piercing tip insert 90 with the threaded ends extending through apertures 96 in the piercing tip insert 90 and extending through aligned holes in the nose portion 84 and are received into tapped and internally threaded aligned apertures 98 in the opposing piercing tip 92. It should be appreciated that when mounted to the upper jaw 22, the outer edges and outer vertically planar wear surfaces of the upper shear blade inserts 68 and the piercing tip insert 90 are substantially coplanar.

It should also be appreciated that the substantially coplanar vertical wear surfaces and outer edges of the upper shear blade inserts 86 are slightly laterally, inwardly offset from the vertical wear surfaces and inner edges of the lower shear blade inserts 66 and guide blade inserts 69 (preferably between a range of about 0.01 inches and 0.05 inches), to permit the upper shearing blade inserts 86 to pass by the lower shearing blade inserts 68 as the upper jaw 22 moves through its range of motion during shearing operations, thereby defining a shearing plane along which a workpiece (such as a steel beam or other material) transversely disposed between the jaws 20, 22 will be sheared. Likewise, the substantially planar vertical wear surfaces and edges of the piercing tip inserts 90, 92 are slightly laterally, inwardly offset from the opposing edges and vertical wear surfaces of the guide blades 69 by the same distance on each side, such that the width of the nose 84 with the piercing tip inserts 90, 92 attached, is preferably between a range of about 0.02 inches and 0.1 inches less than the distance between the guide blades 69 so that the nose 84 can pass between the lower guide blades 69 as upper jaw 22 closes into the slot 66 of the lower jaw 20. Shims (not shown) may be inserted between the various blades and their respective seats to maintain the close tolerances between the respective shearing edges and vertical wear surfaces of the blades and inserts.

FIG. 8 is an exploded perspective view of the actuator pin assembly 100 incorporating a lateral stabilizer 101. FIG. 9 is a partial cross-sectional view of the actuator pin assembly 100 incorporating the lateral stabilizer 101 as viewed along lines 9-9 of FIG. 6. The actuator pin assembly incorporating the lateral stabilizer 101 includes a puck or wear plate 102, one or more puck shims 104, a pin 106, a pin cap 108 and one or more pin cap shims 110. The pin 106 includes a head 112 with a recess 114 configured to receive the puck 102 and puck shims 104. The puck 102 and puck shims 104 are secured within the recess 114 of the head 112 by threaded connectors 116 (such as socket head cap screws) with their threaded ends extending through apertures 118 in the puck and shims and which are threadably received by aligned apertures 120 in the head 112.

The outer periphery 113 of the head 112 includes a square, hexagonal or other suitable configuration, which is mateably received by a complimentary configuration of a pin keeper 122 secured to the forward clevis 124 of the piston rod 44 of the lower actuator 32. The pin cap 108 includes a recess 130 sized to receive a distal end 132 of the pin 106. The pin cap 108 is secured to the distal end 132 of the pin 106 by threaded connectors 116 (such as socket head cap screws) with their ends extending through apertures 134 in the pin cap 108 and apertures 136 in the pin cap shims 110 and which are threadably received by aligned apertures (not visible) in the distal end 132 of the pin 106.

The outer periphery 138 of the pin cap 108 includes a square, hexagonal or other suitable configuration which is mateably received by a complimentary configuration of a pin keeper 122 secured to the forward clevis 124 of the piston rod 44 of the lower actuator 32. It should be appreciated that the complimentary mating configurations of the outer periphery 113 of the head 112 and pin keeper 122 and the pin cap 108 and pin keeper 122 prevent the pin 106 from rotating with respect to the forward clevis 124. A grease fitting 140 may be incorporated into the distal end 132 of the pin 106 to lubricate the surfaces of the pin 106 and the opening in the clevis 124.

Referring to FIGS. 3-5 and FIG. 7, a raised wear surface 99 is provided adjacent the inside face of the left hub 30. This wear surface 99 extends along the path of the actuator pin assembly 100 as shown in FIGS. 3-5 as the upper jaw 22 moves between the open position and closed position.

It should be appreciated that when the upper jaw 22 moves downwardly and begins to shear through a workpiece, tremendous lateral forces are exerted on the upper jaw in the direction away from the blade-side jaw beam 60 toward the guide-side jaw beam 62. These lateral forces produce a moment in the direction of the lateral forces about the jaw pivot pin 26. The puck 102 of the lateral stabilizer 101 incorporated into the actuator pin assembly 100 bears against the wear surface 99 to restrain the upper jaw 22 from translating laterally by providing a reactionary force and counteracting moment, and to thereby minimize stress on the jaw pivot pin 26 and the upper jaw 22. The puck 102 of the lateral stabilizer 101 preferably remains in bearing contact with the wear surface 99 until the nose 84 of the upper jaw 22 is received within the slot 66 of the lower jaw 22 at which point the nose 84 of the upper jaw 22 becomes laterally restrained between the opposing guide blades 69.

While the foregoing embodiment is particularly suited for demolition shear attachments which utilize dual actuators, it should be appreciated that incorporating the lateral stabilizer 101 into the actuator pin assembly 100 may be equally suited for demolition shear attachments 10 which utilize only a single actuator. Furthermore, by incorporating a lateral stabilizer into an actuator pin which attaches the actuator to the upper jaw, there may be advantages in manufacturing costs with respect to material and labor when compared to the conventional means of mounting lateral stabilizers in the main body of the demolition shear and providing the wear surface on the upper jaw. There may also be advantages in functionality and performance when compared to the conventional means of mounting lateral stabilizers in the main body of the demolition shear.

Various modifications to the preferred embodiment, and the general principles and features of the apparatus described herein will be readily apparent to those of skill in the art. Thus, the present invention is not to be limited to the embodiments described above and illustrated in the drawing figures, but is to be accorded the widest scope consistent with the spirit and scope of the appended claims.

The invention claimed is:

1. A demolition shear, comprising:
a main body having a forward end and a rearward end, said forward end of said main body including a lower jaw;
an upper jaw pivotally supported by a pivot pin at said forward end of said main body;
at least one actuator pivotally attached to said upper jaw by an actuator pin, said at least one actuator adapted to pivotally move said upper jaw about said pivot pin between an open position and a closed position, said pivotal movement of said upper jaw defining an arcuate path of said actuator pin;
said actuator pin including a wear plate, said wear plate in bearing contact with an arcuate wear surface on said main body as said wear plate moves along at least a portion of said arcuate path, said bearing contact between said wear plate and said wear surface restraining said upper jaw from lateral translation.

2. The demolition shear of claim 1 wherein said wear plate is received within a head of said actuator pin.

3. The demolition shear of claim 2 wherein said head of said actuator pin has an outer periphery which is received within a complimentary configured keeper in one side of a clevis end of said actuator such that said head of said actuator pin is rotationally fixed with respect to said keeper.

4. The demolition shear of claim 3 wherein said actuator pin further includes a pin cap adapted to secure to a distal end of said actuator pin, said pin cap having an outer periphery configured to be receivable within a complimentary configured keeper in another side of said clevis end of the actuator such that said pin cap is rotationally fixed with respect to said keeper.

5. A demolition shear having a main body, a lower jaw and a pivoting upper jaw, the pivoting upper jaw caused to pivot about a jaw pivot axis between an open position toward a closed position during shearing operations upon extending and retracting an actuator rod having a clevis end connected to said upper jaw by an actuator pin assembly, the actuator pin assembly moving along an arcuate path as said upper jaw pivots between the open and closed position, the actuator pin assembly comprising:
a pin having a head, said head having an outer periphery configured to be received within a complimentary configured keeper attached to one side of the clevis end of the actuator such that said head is rotationally fixed with respect to said keeper;
a pin cap adapted to secure to a distal end of said pin, said pin cap having an outer periphery configured to be received within a complimentary configured keeper attached to another side of the clevis end of the actuator such that said pin cap is rotationally fixed with respect to said keeper;
a wear plate received within said head, said wear plate disposed to bear against an arcuate wear surface on the main body of the demolition shear as the actuator pin assembly moves along at least a portion of the arcuate path so as to laterally restrain the upper jaw of the demolition shear as the upper jaw pivots between the open position toward the closed position during shearing operations.

* * * * *